(12) United States Patent
Beck et al.

(10) Patent No.: US 12,420,235 B2
(45) Date of Patent: Sep. 23, 2025

(54) HOLLOW FIBER MEMBRANE TRANSPORT CARTRIDGE

(71) Applicant: GAMBRO LUNDIA AB, Lund (SE)

(72) Inventors: Christof Beck, Bitz (DE); Rainer Blickle, Bitz (DE); Stefan Ermantraut, Balingen (DE); Bernd Hertzler, Balingen (DE); Steffen Wagner, Messstetten (DE)

(73) Assignee: GAMBRO LUNDIA AB, Lund (SE)

( * ) Notice: Subject to any disclaimer, the term of this patent is extended or adjusted under 35 U.S.C. 154(b) by 618 days.

(21) Appl. No.: 17/788,057

(22) PCT Filed: Dec. 29, 2020

(86) PCT No.: PCT/EP2020/087958
§ 371 (c)(1),
(2) Date: Jun. 22, 2022

(87) PCT Pub. No.: WO2021/136767
PCT Pub. Date: Jul. 8, 2021

(65) Prior Publication Data
US 2023/0043900 A1    Feb. 9, 2023

(30) Foreign Application Priority Data
Dec. 31, 2019    (EP) .................................... 19220172

(51) Int. Cl.
B01D 63/02    (2006.01)
(52) U.S. Cl.
CPC .... B01D 63/0231 (2022.08); *B01D 2313/025* (2013.01)

(58) Field of Classification Search
CPC ........ B01D 63/04; B01D 63/02; B01D 63/00; D01G 1/04; D06H 7/00
See application file for complete search history.

(56) References Cited

U.S. PATENT DOCUMENTS 5,104,535 A * 4/1992 Cote .................. B01D 63/0231
                                          210/321.89
5,182,019 A    1/1993 Cote et al.

FOREIGN PATENT DOCUMENTS

| EP | 1152817 | 11/2001 |
|---|---|---|
| WO | WO2017127625 | 7/2017 |
| WO | WO2018178124 | 10/2018 |

OTHER PUBLICATIONS

PCT Search Report and Written Opinion prepared for PCT Application No. PCT/EP2020/087958, completed Mar. 29, 2021.

* cited by examiner

*Primary Examiner* — Hayden Brewster
(74) *Attorney, Agent, or Firm* — Barnes & Thornburg LLP

(57) ABSTRACT

The present disclosure relates to a cartridge for a plurality of dry hollow fiber membranes having a large inner diameter. The cartridge fastens the capillaries in their position and protects them from damage. The present disclosure also relates to an apparatus and a process for cutting a plurality of dry hollow fiber membranes having a large inner diameter.

14 Claims, 1 Drawing Sheet

HOLLOW FIBER MEMBRANE TRANSPORT CARTRIDGE

CROSS-REFERENCE TO RELATED APPLICATIONS

This application is a national stage entry under 35 U.S.C. § 371 (b) of PCT International Application No. PCT/EP2020/087958, filed Dec. 29, 2020, which claims the benefit of European Patent Application Serial No. 19220172.1, filed on Dec. 31, 2019, the entire disclosures of both of which are incorporated herein by reference.

TECHNICAL FIELD

The present disclosure relates to a cartridge for a plurality of dry hollow fiber membranes having a large inner diameter. The cartridge fastens the capillaries in their position and protects them from damage. The present disclosure also relates to an apparatus and a process for cutting a plurality of dry hollow fiber membranes having a large inner diameter.

DESCRIPTION OF THE RELATED ART

Liquids destined to be infused into a patient's body, in particular into the bloodstream of a patient, have to be free of pyrogens and particulate matter. To protect the patient, infusion solutions therefore typically are passed through a filter device installed in the infusion line before they enter the patient's body. Commercially available devices generally comprise a microporous flat sheet membrane. Filter devices comprising hollow fiber membranes instead of flat sheet membranes also have been proposed.

EP 3 405 277 A1, EP 3 431 171 A1 and EP 3 388 141 A1 disclose semipermeable hollow fiber membranes having a large inner diameter and comparatively thin walls, as well as sterilizing filters for dead-end filtration of medical liquids comprising these semipermeable hollow fiber membranes.

Due to their large inner diameter and the comparatively thin wall, these hollow fiber membranes are easily damaged by mechanical stress and require particular care during processing.

SUMMARY

The present disclosure provides a cartridge for a plurality of dry hollow fiber membranes having a large inner diameter. The cartridge fastens the capillaries in their position and protects them from damage. The present application also provides an apparatus and a process for cutting a plurality of dry hollow fiber membranes having a large inner diameter. The devices are used in a process for producing sterilizing filters destined for dead-end filtration of liquids for infusion into a patient.

DETAILED DESCRIPTION

Figure 1:
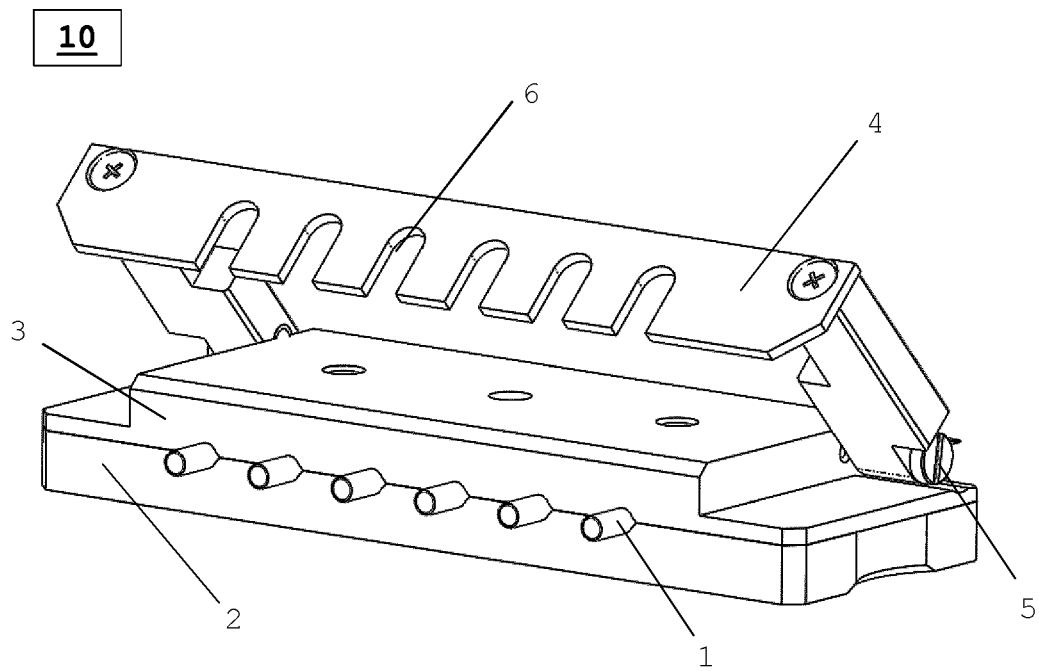
FIG. 1 is a schematic view of an embodiment of a cartridge of the present disclosure in opened state.

The present disclosure provides a cartridge for holding a plurality of dry hollow fiber membranes having a large inner diameter. The cartridge performs different functions. First, the hollow fibers are fastened and held in position for the cutting step by the cartridge. Second, the cartridge is used to transport a defined number of fibers cut to length from one production machine or production step to the next. Third, the cartridge protects an end of the fibers protruding from the cartridge from damage during transport. Additionally, the cartridge is designed to provide a safety feature which is detected by an optical sensor and triggers the operation of subsequent process steps performed on the fibers present in the cartridge.

Unlike with common cartridges or trays, where the product has to be taken out for processing, the hollow fiber membranes stay inside the cartridge of the present disclosure during one or more steps of manufacturing sterilizing filters. Therefore, the cartridge has to allow for processing of the hollow fiber membranes and to protect the fibers during transport and processing.

The cartridge is used for holding and processing microporous hollow fiber membranes having a large inner diameter and thin walls, such as the hollow fiber membranes described in EP 3 405 277 A1 and EP 3 431 171 A1.

In one embodiment, the semipermeable hollow fiber membrane has an inner diameter of from 2.8 to 4.0 mm, for instance, from 3.0 to 3.7 mm, or from 3.1 to 3.5 mm; and a wall thickness of from 100 to 500 µm, for instance, from 180 to 320 µm. The outer diameter of the semipermeable hollow fiber membrane is larger than 3 mm and smaller than 4.5 mm. In one embodiment, the ratio of inner diameter to wall thickness of the membrane is larger than 10, or even larger than 15.

In one embodiment, the semipermeable hollow fiber membrane has a mean flow pore size, determined by capillary flow porometry, in the range of from 0.2 to 0.5 µm.

Capillary flow porometry is a liquid extrusion technique in which the flow rates through wet and dry membranes at differential gas pressure are measured. Before measurement, the membrane is immersed in a low surface tension liquid (e.g., a perfluoroether commercially available under the trade name Porofil®) to ensure that all pores including the small ones are filled with the wetting liquid. By measuring the pressure at which the liquid is pressed out of the pores their corresponding diameter can be calculated using the Laplace equation. With this method, the pore size distribution of those pores that are active in the mass transport is determined. Dead-end and isolated pores are omitted. The hollow fiber membranes are measured inside-out.

$$Dp = 4\gamma \cos \theta / \Delta P \quad \text{Laplace equation:}$$

Dp=diameter of pores [m]
$\gamma$=surface tension [N/m]; for Porofil® 0.016 [N/m]
$\Delta P$=pressure [Pa]
Cos $\theta$=contact angle; for complete wetting cos $\theta$=1

In one embodiment, the semipermeable hollow fiber membrane comprises polyethersulfone (PESU) and polyvinylpyrrolidone (PVP). In one embodiment, the semipermeable hollow fiber membrane additionally comprises a polymer bearing cationic charges. Examples of suitable polymers bearing cationic charges include polyethyleneimines, modified polyethyleneimines, and modified polyphenyleneoxides.

In one embodiment, the hollow fiber membrane is produced by a continuous solvent phase inversion spinning process comprising extruding a polymer solution through an outer ring slit of a nozzle with two concentric openings into a precipitation bath while simultaneously extruding a center fluid through the inner opening of the nozzle; subsequently washing the membrane obtained; cutting the membrane into sections having a predefined length, and subsequently drying the cut hollow fiber membranes.

The cartridge of the present disclosure is configured to hold a plurality of hollow fiber membranes having an outer diameter which is larger than 3 mm and smaller than 4.5 mm.

In one embodiment, the cartridge is configured to hold at least two hollow fiber membranes, for instance, 2 to 12 hollow fiber membranes, or 4 to 10 hollow fiber membranes, or even 5 to 8 hollow fiber membranes, for instance 6 hollow fiber membranes.

The cartridge comprises a bottom plate featuring a plurality of parallel notches having a semicircular profile with a diameter matching the diameter of the hollow fiber membranes, the wall of each notch featuring at least one bore connecting the wall of the notch with the underside of the bottom plate. The bore can be used to connect the notch to a suction device and apply reduced pressure to the outside of the fiber, thereby fastening it in the cartridge. In one embodiment, the wall of the notch features an elongated groove in fluid connection with the bore. The groove serves to increase the effect of the reduced pressure on the wall of the hollow fiber membrane, thereby increasing the force holding the hollow fiber membrane in position.

The cartridge also comprises a top cover configured to cover the bottom plate. Length and width of the top cover match those of the bottom plate. In one embodiment, top cover and bottom plate can be attached to each other by mortise and tenon joints. In one embodiment, at least two tenons are present at the underside of the top cover, and matching mortises are present in the bottom plate. In another embodiment, top cover and bottom plate can be attached to each other by magnetic force. In a further embodiment, the bottom plate is a permanent magnet.

The bottom surface of the top cover features a plurality of parallel notches having a semicircular profile with a diameter matching the diameter of the hollow fiber membranes. Each notch matches a corresponding notch in the bottom plate. The corresponding notches form compartments for the hollow fiber membranes.

In one embodiment, the top cover comprises an additional sealing element comprised of an elastic material. In one embodiment, the elastic material is silicone. In another embodiment, the elastic material is rubber. The sealing element has an elongated shape and extends in a direction perpendicular to the parallel notches. The sealing element pushes on the hollow fiber membranes when the top cover is attached to the bottom plate, thereby additionally fastening the hollow fibers in position.

The top cover features a hinge near the edge of one of its longitudinal sides. A moveable frame is attached to the hinge and can rotate around the hinge, i.e., around an axis parallel to the edge of the top cover, to open or close the cartridge. The frame comprises two brackets and a cover plate attached to them. The cover plate of the frame features a plurality of recesses, each recess surrounding one of the fibers when the frame is in the closed position, i.e. the brackets lie flat on the cover plate and the upper edge of the cover plate is level with the upper surface of the top cover.

After the cutting step, the frame is fully opened, i.e. rotated around the hinge into a position wherein the frame extends horizontally from the top plate, in order to protect the longer ends of the fibers protruding from the cartridge from any damage during transfer to another fiber processing unit or process step, respectively. Before performing another process step, the frame is closed again.

The frame is designed to be detected by sensors when open. For example, if the frame is open, this will be identified by an optical sensor at the cutting machine and the machine will not start. In one embodiment, a photo sensor and a reflection plate are arranged above the cartridge. When the movable frame is closed, the photo signal of the sensor is reflected by the reflection plate. In this situation, the cutting process can be started. When the frame is open, the photo signal from the photo sensor is blocked by the cover plate of the frame and cannot be reflected by the reflection plate. In this situation, start of the cutting machine is suppressed. Similar sensors can be present at other fiber processing units to make sure that the cartridge is in the correct configuration for the respective process step.

When the fibers are to be removed from the cartridge, for instance, by a picker arm, the complete top cover including the frame is removed. In one embodiment, this is also detected by an optical sensor and the machine will only start when the sensor has detected removal of the top plate.

The present disclosure also provides a device for cutting a plurality of hollow fiber membranes. The device comprises a base plate having a plurality of fiber supports aligned in parallel rows on the base plate, each fiber support comprising suction means for supporting a hollow fiber membrane and fastening it to the fiber support, and a notch extending in a direction perpendicular to the longitudinal axis of the hollow fiber membrane, the notches of each row being aligned; suction means for attaching a plurality of cartridges as described above to the base plate in-between the parallel rows of fiber supports, so that the fiber compartments of the cartridges are aligned with the fiber supports; a plurality of cartridges as described above being attached to the base plate; and a cutting unit comprising at least two blades or knifes configured to be inserted into the notches of the aligned fiber supports and cut the plurality of hollow fiber membranes. In one embodiment, the cutting unit comprises a number of blades or knifes equal to the number of parallel rows of fiber supports, i.e., a blade or knife for each row. For instance, if the base plate has four parallel rows of fiber supports, the cutting unit comprises four blades The base plate also features bores which match the bores of the bottom plates of the cartridges and connect them to the suction means, e.g., a vacuum pump.

In one embodiment, four parallel rows of fiber supports are present on the base plate, and three parallel rows of cartridges are arranged between them. In a further embodiment, each row of cartridges comprises two cartridges. In another embodiment, each row of cartridges comprises three cartridges. In still another embodiment, each row of cartridges comprises four cartridges.

The present disclosure also provides a process for the production of hollow fiber membranes having a predefined length. The process involves attaching a plurality of hollow fiber membranes onto the supports of the cutting device described above, such that the orientation of the hollow fiber membranes is perpendicular to the parallel rows of the fiber supports, closing the cartridges to fasten the hollow fiber membranes in a fixed position; and cutting the hollow fiber membranes into sections having a predefined length by inserting blades into the notches of the fiber supports.

In one embodiment of the process, the bottom plates of the cartridges are mounted on the base plate first, then the plurality of fibers is put onto the fiber supports and fastened by suction. Subsequently the top plates of the cartridges are placed onto their corresponding bottom plates and their moveable frames are moved into the closed position. Then the fibers are cut into sections having a predefined length by the cutting unit by inserting blades into the notches of the fiber supports.

In one embodiment, the predefined length is in the range of from 5 cm to 10 cm, for instance, from 6 cm to 8 cm.

Exemplary embodiments of the cartridge of the present disclosure are shown in the accompanying figures and are described below. It will be understood that the features mentioned above and those described hereinafter can be used not only in the combination specified but also in other combinations or on their own, without departing from the scope of the present invention.

FIG. 1 is a schematic view of an embodiment of a cartridge 10 in an opened state. The cartridge 10 holds six hollow fiber membranes 1 arranged in parallel. Typically, the number of fibers in the cartridge matches the number of fibers present in the final product to be produced using the hollow fiber membranes, i.e., a sterilizing filter. Thus, a sterilizing filter unit can be produced using the contents of one fiber cartridge. There can be cartridges with more or less than six fibers.

The cartridge comprises of a bottom part 2 and a top cover 3. Matching grooves in the bottom part 2 and the top cover 3 extending throughout the cartridge 10 form the fiber compartments of the cartridge 10.

A movable frame 4 is connected to the top cover 3 via a hinge 5. The movable frame 4 can be rotated around the hinge 5 to open and close the cartridge 10. The frame 4 comprises two brackets and a cover plate attached to them. The cover plate of the frame 4 features recesses 6, each recess surrounding one of the fibers 1 when the frame 4 is in the closed position, level with the top surface of the top cover 3.

Figure 2:
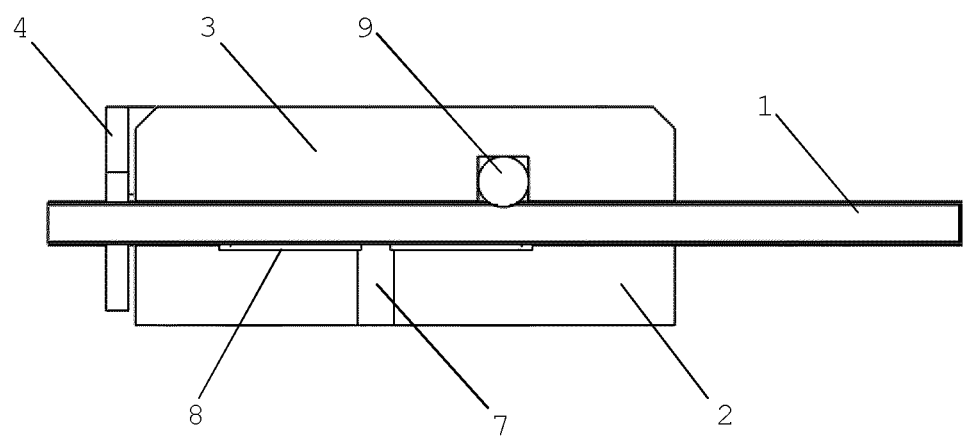
FIG. 2 is a cross-sectional side view of the cartridge of FIG. 1 in closed state.

FIG. 2 shows a cross-sectional side view of the fiber cartridge 10 in its closed state. A hollow fiber membrane 1 is shown within the cartridge 10, a short end of the fiber 1 protruding from the cartridge 10 on the left side and a long end of the fiber 1 protruding from the cartridge 10 on the right side. The long end on the right side is mostly endangered during manual transfer between production steps. To keep the fiber 1 in its position, it is fastened by the top cover 3 and the bottom part 2. Fixation of the fiber 1 in the cartridge 10 is additionally supported by a sealing element 9, which can be comprised of silicone or a comparable material.

It is very essential that the fiber 1 keeps its position even when the top cover 3 is removed to allow for removal of the fiber 1. The sealing element 9 is removed together with the top cover 3. Therefore, the bottom part 2 comprises bores 7 below every fiber 1. Vacuum can be applied to the bores 7 to keep the fibers 1 in position, even if the top cover 3 is removed. To improve the effect of the vacuum, grooves 8 are connected to the bores 7 in the bottom part 2.

LIST OF REFERENCE SIGNS 1 hollow fiber membrane
2 bottom part
3 top cover
4 moveable frame
5 hinge
6 recess
7 bore
8 groove
9 sealing element
10 cartridge

The invention claimed is:

1. A cartridge for holding a plurality of hollow fiber membranes, wherein each of the plurality of hollow fiber membranes has an outer diameter which is larger than 3 mm and smaller than 4.5 mm, said cartridge comprising
  i) a bottom plate comprising a first underside, a first length, a first width, and a first plurality of parallel notches having a semicircular profile with a first diameter matching the outer diameter of the plurality of hollow fiber membranes, wherein each of the first plurality of parallel notches comprises a wall, and wherein the wall of each of the first plurality of parallel notches comprises at least one bore connecting the wall of the first plurality of parallel notches with the first underside of the bottom plate; and
  ii) a top cover comprising a second underside, a second length, a second width, one or more longitudinal sides configured to cover the bottom plate and to be attached to the bottom plate, wherein the second length and the second width match the first length and the first width of the bottom plate, wherein the second underside of the top cover comprises a second plurality of parallel notches having a semicircular profile with a second diameter matching the outer diameter of the plurality of hollow fiber membranes, wherein the second plurality of parallel notches matches the first plurality of parallel notches in the bottom plate, wherein the top cover comprises a hinge located near an edge of one of the longitudinal sides of the top cover, and a moveable frame attached to the hinge and rotatable around the hinge to open or close the cartridge, wherein the moveable frame comprises a first bracket, a second bracket, and a cover plate attached to the first bracket and the second bracket, wherein the cover plate comprises a plurality of recesses, wherein each of the plurality of recesses surrounds one of the hollow fiber membranes when the cartridge is closed.

2. The cartridge of claim 1, further configured to hold a plurality of hollow fiber membranes in the range of 5 to 8.

3. The cartridge of claim 1, wherein the wall of the first plurality of notches in the bottom plate comprises an elongated groove in fluid connection with the bore.

4. The cartridge of claim 1, wherein the top cover and the bottom plate can be attached to each other by mortise and tenon joints.

5. The cartridge of claim 1, wherein the top cover comprises a sealing element comprised of an elastic material, having an elongated shape, and extending in a direction perpendicular to the first plurality of parallel notches present in the top cover.

6. A device for cutting a plurality of hollow fiber membranes, the device comprising:
  i. a base plate comprising
    a) a plurality of fiber supports aligned in parallel rows on the base plate, wherein each of the plurality of fiber supports comprises a suction means for supporting a hollow fiber membrane and fastening the hollow fiber membrane to the plurality of fiber supports, wherein the hollow fiber membrane comprises a longitudinal axis, and, wherein each of the plurality of fiber supports comprises a notch extending in a direction perpendicular to the longitudinal axis of the hollow fiber membrane, and wherein each notch of the plurality of fiber supports of each row are aligned;
    b) suction means for attaching a plurality of cartridges according to claim 1 to the base plate in-between the plurality of fiber supports aligned in parallel rows, wherein each of the plurality of cartridges comprises a fiber compartment so that the fiber compartments of the cartridges are aligned with the plurality of fiber supports;

c) a first plurality of bores which match a second plurality of bores of the bottom plates of the cartridges according to claim 1 and connection of the first plurality of bores and the second plurality of bores to the suction means;

ii. the plurality of cartridges according to claim 1 being attached to the base plate; and iii. a cutting unit comprising at least two blades or knives configured to be inserted into the plurality of notches of the aligned plurality of fiber supports and to cut the plurality of hollow fiber membranes.

7. The device of claim 6, wherein the suction means comprise a vacuum pump.

8. The device of claim 6, wherein four parallel rows of fiber supports are present on the base plate, and wherein three parallel rows of cartridges are arranged between the four parallel rows of fiber supports.

9. The device of claim 8, wherein each of the three parallel rows of cartridges comprises two cartridges.

10. A process for the production of a plurality of hollow fiber membranes having a predefined length, said process comprising the steps of:

i) attaching a plurality of hollow fiber membranes onto the plurality of fiber supports of the cutting device of claim 6, wherein the orientation of the plurality of hollow fiber membranes is perpendicular to the parallel rows of the plurality of fiber supports, ii) closing the plurality of cartridges of claim 6 to fasten the plurality of hollow fiber membranes in a fixed position; and iii) cutting the plurality of hollow fiber membranes into sections having a predefined length by inserting blades into the plurality of notches of the plurality of fiber supports.

11. The process of claim 10, wherein the plurality of cartridges attached to the base plate comprise a plurality of bottom plates mounted to the base plate first, then the plurality of hollow fiber membranes is attached onto the plurality of fiber supports and fastened by suction, subsequently a plurality of top plates of the plurality of cartridges are placed onto their corresponding bottom plates and a plurality of moveable frames are moved into a closed position, and then the plurality of hollow fiber membranes are cut into sections having a predefined length by inserting blades into the plurality of notches of the plurality of fiber supports.

12. The process of claim 10, wherein the predefined length of the sections of the plurality of hollow fiber membranes is in the range of 5 cm to 10 cm.

13. The process of claim 11, wherein the predefined length of the sections of the plurality of hollow fiber membranes is in the range of 5 cm to 10 cm.

14. The device of claim 7, wherein four parallel rows of fiber supports are present on the base plate, and wherein three parallel rows of cartridges are arranged between the four parallel rows of fiber supports.

* * * * *